UNITED STATES PATENT OFFICE.

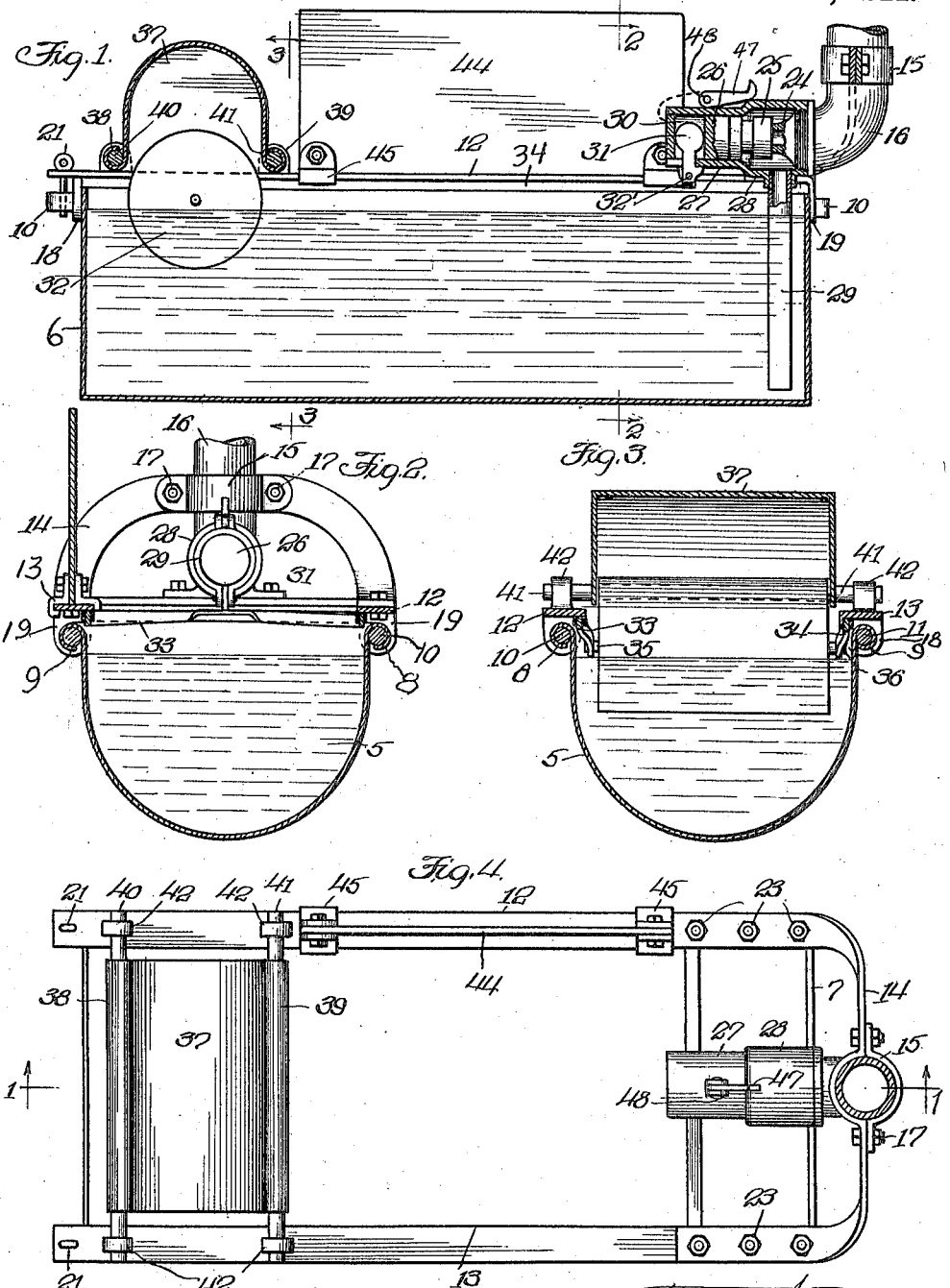

WILLIAM L. MARTIN, OF HARVARD, ILLINOIS.

AUTOMATIC WATERING-BOWL OR DRINKING-FOUNTAIN.

1,393,303.  Specification of Letters Patent.  Patented Oct. 11, 1921.

Application filed December 1, 1920. Serial No. 427,468.

*To all whom it may concern:*

Be it known that I, WILLIAM L. MARTIN, a citizen of the United States, residing at Harvard, in the county of McHenry and State of Illinois, have invented certain new and useful Improvements in Automatic Watering-Bowls or Drinking-Fountains, of which the following is a specification.

The invention relates to improvements in automatic watering bowls or drinking fountains.

One of the objects of the invention is to provide an improved watering bowl for supplying drinking water to stock and more particularly to milch cows.

Another object is to provide an automatic means for maintaining at all times an adequate supply of drinking water in the bowl, or fount, which is not within the control of and cannot be interfered with in any manner by the animals that drink therefrom.

Another object is the provision of means to prevent two adjacent animals from drinking from the same bowl, thereby protecting them from the spread of "mouth disease."

Another object is the provision of means for disconnecting the bowl from the supporting frame conveniently to clean or empty the bowl.

Another object is to provide improved means whereby the bowl and its appurtenances are conveniently supported by the water supply pipe.

Another object is to hinge the bowl at both of its side edges whereby to selectively swing it into inverted position to empty and clean it.

Other, further and more specific objects of the invention will become readily apparent to persons skilled in the art, from a consideration of the following description, when taken in conjunction with the drawings, wherein:—

Figure 1 is a central, longitudinal section taken on line 1—1 of Fig. 4.

Fig. 2 is a transverse section taken on line 2—2 of Fig. 1.

Fig. 3 is a transverse section taken on line 3—3 of Fig. 1, and

Fig. 4 is a plan view of the device.

In all the views the same reference characters are employed to indicate similar parts.

The bowl is made, preferably, in the form of a trough with closed ends and sides terminating in scrolls or hollow cylinders and preferably made of sheet metal.

The bowl proper 5, as shown, is U-shape in cross section having closed ends 6 and 7. Its upper longitudinal edges are turned outwardly into scrolls, or hollow cylinders, 8 and 9, to receive supporting rods 10 and 11, respectively.

A supporting frame, for supporting the bowl 5, consists of two horizontal members 12 and 13, preferably in the shape of flat bars, joined together at one end and turned upwardly, as at 14, into a plane substantially at right angles to the horizontal plane, and provided with a clip 15 on the upturned end for connection with a water supply pipe 16, by which the frame and bowl are supported. The clip is held to the bars 12 and 13, at the end 14, by means of bolts 17 that take through the clip and through the bar.

Near the end of the horizontal members 12 and 13, are downwardly depending eyes or perforated lugs 18 and 19, there are a pair of such spaced-apart eyes for each rod 10 and 11. The free end of each of the side members, 12 and 13, is perforated, through which a pin 21 passes into and through the outer ends of the rods 10 and 11, respectively. The pins hold the rods in place and prevent their displacement.

It has heretofore been explained that the rods 10 and 11 pass through the cylindrical terminal edges of the bowl 5, for the purpose of holding the bowl in place. In the event that it should be desirable to empty the bowl of its contents and for the purpose of cleaning it, either one of the rods 10 or 11 may be pulled out of its place and the bowl may be made to swing clear and freely upon the other rod into inverted position, the remaining rod serving as a pintle upon which the bowl turns.

Instead of making the frame members 12 and 13 of one piece joined by an integral yoke 14, the yoke may be made of a separate piece and joined to the horizontal frame members 12 and 13, by bolts 23.

On the end of the water supply pipe 16 is a nozzle 24, serving as a port and closed by a valve 25, which is, preferably, a part of a plunger 26 that is reciprocable within the cylinder 27. The cylinder is a part of the valve housing 28 in the lower end of which is screwed a water feed pipe 29 which extends to the bottom of the bowl and through which water comes from the supply pipe 16 into the bowl.

The object of placing the discharge end of the pipe at the bottom of the bowl is to prevent splashing of water when it is fed into the bowl. The splash of the water has a tendency to frighten the animals, but when the water is fed into the bowl from near the bottom, there is no splash.

The piston 26 is provided with a slot 30 that extends diametrically thereof and into which projects a short lever 31, pivoted as at 32'. Two longer levers 33 and 34 are connected to the shorter lever 31 and extend forwardly and are connected to each end of the float 32. The levers, 33 and 34, are located under the side members 12 and 13, respectively, of the supporting frame, so that they are protected by the respective side members and are inaccessible by the stock, or animals that drink from the bowl. The object of making two side levers 33 and 34 is to connect them to each end of the float and to be able to protect them by the frame. The levers 33 and 34 are connected to the float 32, as at 35 and 36, respectively.

A protecting housing 37 is placed over the float to protect and guard it against interference by the animals and consists of a trough-shape housing, similar in character to that of the bowl, having on opposite edges cylindrical formations 38 and 39, similar to the cylindrical terminations 8 and 9 of the bowl. Rods 40 and 41 pass through the cylindrical portions 38 and 39 of the housing 37 and into hollow lugs, or eyes 42, that are secured to the frame members 12 and 13. If it is desired to get at the float 32 for any purpose, one of the rods 40 or 41, may be pulled out of its position and the housing 37 may be rotated upon the other rod, as in the case with the bowl, as heretofore described.

A vertical wall 44 may be secured to either of the frame members 12 and 13, by means of clips 45. It is a means by which adjacent animals are prevented from drinking out of the bowl provided for a particular animal and to prevent the particular animal from drinking from the bowl of the adjacent animal.

When it is desired to shut off the water supply, by closing the nozzle 24, in order that it may not be affected by the operation of the float 32, a latch 47 is pivoted, as at 48, to the cylinder 27 and when thrown forward, as shown in dotted line position in Fig. 1, it holds the piston 26, so that its valved end is in contact with the end of the nozzle and retains the valve closed; at the same time it retains the float 32 in its most upward position within the housing 37.

Having described my invention what I claim as new and desire to secure by Letters Patent is:—

1. A device of the character described having in combination a bowl provided with hollow, cylindrical, longitudinal edges; a supporting frame for said bowl having perforate lugs or eyes, depending therefrom spaced apart to admit the cylindrical edges and rods passing through the cylinders and respective eyes to hold the bowl in place.

2. A device of the character described having in combination a frame providing two, parallel, horizontal side members extending upwardly near their point of juncture; means to connect the upwardly extending part to a water supply pipe; spaced apart eye pieces extending downwardly, one near each end of the horizontal part of each frame member; a bowl having its side edges terminating in hollow cylinders; a rod passing through both eyes of a side member and the respective cylinder of the bowl, one on each side, and means to hold the rods in place.

3. A device of the character described comprising a bowl; a frame having side members to support the bowl; a valve in one end of the bowl; a float in the other end of the bowl; a pivoted lever connected to the valve and having two parallel lever members connected to the respective ends of the float, said levers located in the bowl immediately below the side members of the frame.

4. A device of the character described comprising a bowl; a frame having side members to support the bowl; a valve in one end of the bowl; a float in the other end of the bowl; a pivoted lever having its shorter end engaging the valve, the longer end being bifurcated and extending under the respective frame members to the bowl connected to the respective ends of the float and a protective housing extending over the top of the float.

5. A watering bowl device comprising a semi-cylindrical bowl closed at each end and having hollow cylindrical side edges; a supporting frame, having two parallel side members respectively above said cylindrical edges; perforate lugs depending from said side members, spaced apart to admit the respective cylindrical edges of the bowl between each pair; a rod passing through two said lugs and the cylindrical edge of the bowl, on each side thereof; a valve to admit water, at one end of the bowl; a float at the other end of the bowl; means connecting the valve and float; a semi-cylindrical housing having cylindrical side edges transversely positioned above said frame and overlying the float; perforate lugs extending upwardly from the frame members and a rod passing through each pair of perforate lugs and the respective cylindrical edge of the housing on each side thereof.

6. A watering bowl structure comprising a frame having two parallel side members; a bowl selectively hinged to either side frame member so that the bowl may be swung to inverted position from either side; a valve in one end of the bowl to admit water; a float in the other end of the bowl; means connecting the said valve and float and means to hold the float elevated to close the valve while the bowl is being inverted.

7. A watering bowl structure comprising a frame having two parallel side members; a bowl selectively hinged to either side frame member so that the bowl may be swung to inverted position from either side; a valve in one end of the bowl to admit water in the bowl comprising a nozzle and a plunger; a float in the other end of the bowl arranged to move the plunger valve outwardly to open the nozzle when the water level is low and means to hold the valve on the end of the nozzle when the bowl is inverted.

In testimony whereof I hereunto subscribe my name.

WILLIAM L. MARTIN.